US009435569B2

(12) United States Patent
Yesiller et al.

(10) Patent No.: US 9,435,569 B2
(45) Date of Patent: *Sep. 6, 2016

(54) SYSTEMS AND METHODS FOR TEMPERATURE CONTROL AND HEAT EXTRACTION FROM WASTE LANDFILLS

(71) Applicants: Nazli Yesiller, San Luis Obispo, CA (US); James L. Hanson, San Luis Obispo, CA (US)

(72) Inventors: Nazli Yesiller, San Luis Obispo, CA (US); James L. Hanson, San Luis Obispo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/522,503

(22) Filed: Oct. 23, 2014

(65) Prior Publication Data

US 2015/0136354 A1 May 21, 2015

Related U.S. Application Data

(63) Continuation-in-part of application No. 14/162,448, filed on Jan. 23, 2014, now Pat. No. 9,255,727, which is a continuation of application No. 13/190,313, filed on Jul. 25, 2011, now Pat. No. 8,672,586.

(51) Int. Cl.
*F24J 1/00* (2006.01)
*B09B 1/00* (2006.01)
*F24J 3/08* (2006.01)
*F25B 27/02* (2006.01)

(52) U.S. Cl.
CPC .............. *F24J 3/084* (2013.01); *B09B 1/006* (2013.01); *F25B 27/02* (2013.01); *F24J 2003/089* (2013.01); *Y02E 10/125* (2013.01)

(58) Field of Classification Search
CPC ...................................... F25B 27/02
See application file for complete search history.

(56) References Cited

U.S. PATENT DOCUMENTS

| | | |
|---|---|---|
| 5,788,412 A | 8/1998 | Jatkar |
| 6,276,872 B1 | 8/2001 | Schmitt |
| 6,334,737 B1 | 1/2002 | Lee |

(Continued)

FOREIGN PATENT DOCUMENTS

| | | |
|---|---|---|
| CN | 201532023 | 7/2010 |
| KR | 10-0602797 | 7/2006 |

OTHER PUBLICATIONS

Yesiller, N., et al., "Heat Generation in Municipal Solid Waste Landfills", Journal of Geotechnical and Geoenvironmental Engineering, vol. 131, No. 11, 2005, pp. 1330-1344.

(Continued)

*Primary Examiner* — John Kreck
(74) *Attorney, Agent, or Firm* — One LLP

(57) ABSTRACT

The field of the invention relates to systems and methods for exchanging heat from the degradation, decomposition, and chemical/biochemical transformation of municipal, industrial, and other types of waste. In one embodiment, a heat extraction system may include a closed-loop fluid circulation piping channeled throughout at least one heat extraction well oriented throughout a waste mass. The piping is fluidly coupled to a heat exchanger. A first circulation fluid is circulated through the closed-loop circulation piping into various depths of the waste mass to transfer thermal energy between said mass and said heat exchanger. In one embodiment, the transfer of thermal energy between the waste mass and the heat exchanger is used as alternative energy method and to control at least one of shear strength, compressibility, and hydraulic conductivity of the waste mass.

18 Claims, 14 Drawing Sheets

(56) References Cited

U.S. PATENT DOCUMENTS

| | | | |
|---|---|---|---|
| 7,187,299 | B2 | 3/2007 | Kunerth et al. |
| 7,347,049 | B2 | 3/2008 | Rajendran et al. |
| 7,448,828 | B2 | 11/2008 | Augenstein et al. |
| 8,672,586 | B2 * | 3/2014 | Yesiller ............... F25B 27/02 405/129.28 |
| 2006/0249276 | A1 | 11/2006 | Spadafora et al. |

OTHER PUBLICATIONS

Yesiller, N., et al., "Analysis of Temperatures at a Municipal Solid Waste Landfill", Ninth International Waste Management and Landfill Symposium, Italy, 2003, pp. 1-10.

Hanson, J., et al., "Analytical and Numerical Methodology for Modeling Temperatures in Landfills", Proceedings of Selected Sessions of GeoCongress 08: Geotechnics of Waste Management and Remediation, Reston, Virginia, 2008, pp. 24-31.

Hanson, J., et al., "Spatial and Temporal Temperature Distributions in Municipal Solid Waste Landfills", Journal of Environmental Engineering, vol. 136, No. 8, 2010, pp. 804-814.

Klein, R., et al., "Temperature development in a modern municipal solid waste incineration (MSWI) bottom ash landfill with regard to sustainable waste management", Journal of Hazardous Materials, vol. 83, No. 3, 2001, pp. 265-280.

Fox, P.J., "An Analysis of One-Dimensional Creep of Peat", PhD Thesis, University of Wisconsin, Department of Civil and Environmental Engineering, Madison Wisconsin, 1992.

Campanella, R., et al., "Influence of Temperature Variations on Soil Behavior", Journal of Soil Mechanics and Foundation Engineering, vol. 94, No. SM3, 1968, pp. 709-734.

Lamothe, D., et al., "The Effects of Environmental Parameters on the Laboratory Compression of Refuse", Proceedings of the 17th International Madison Waste Conference, University of Wisconsin, Madison, WI, 1994, pp. 592-604.

* cited by examiner

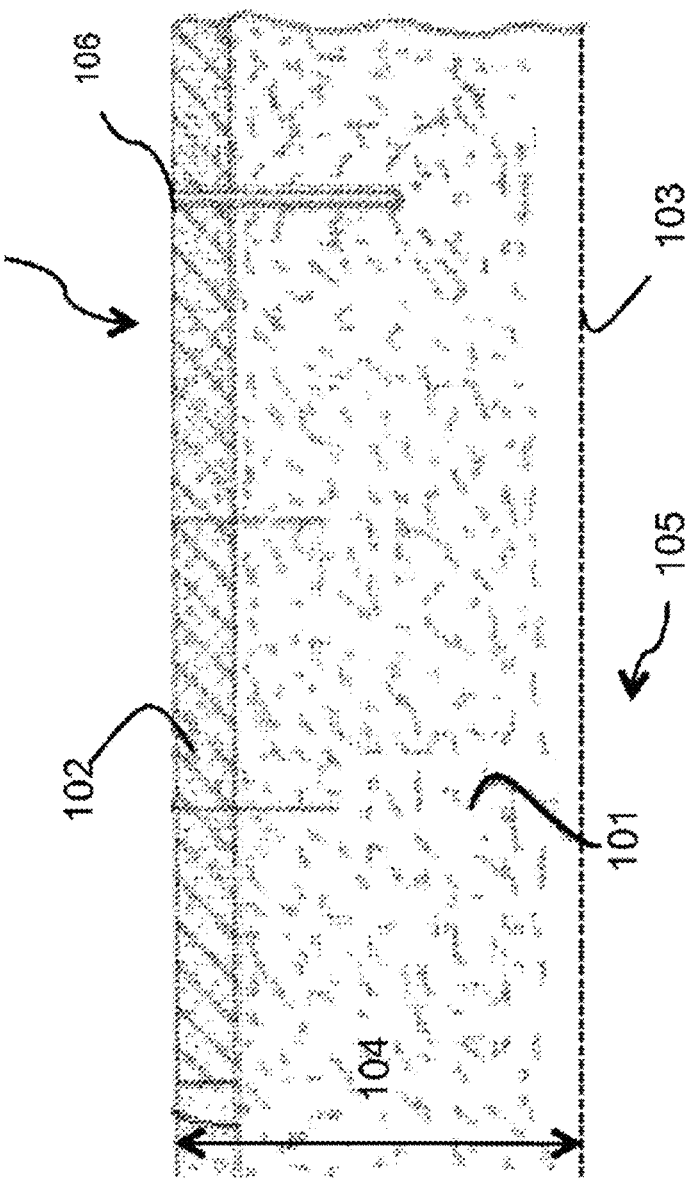

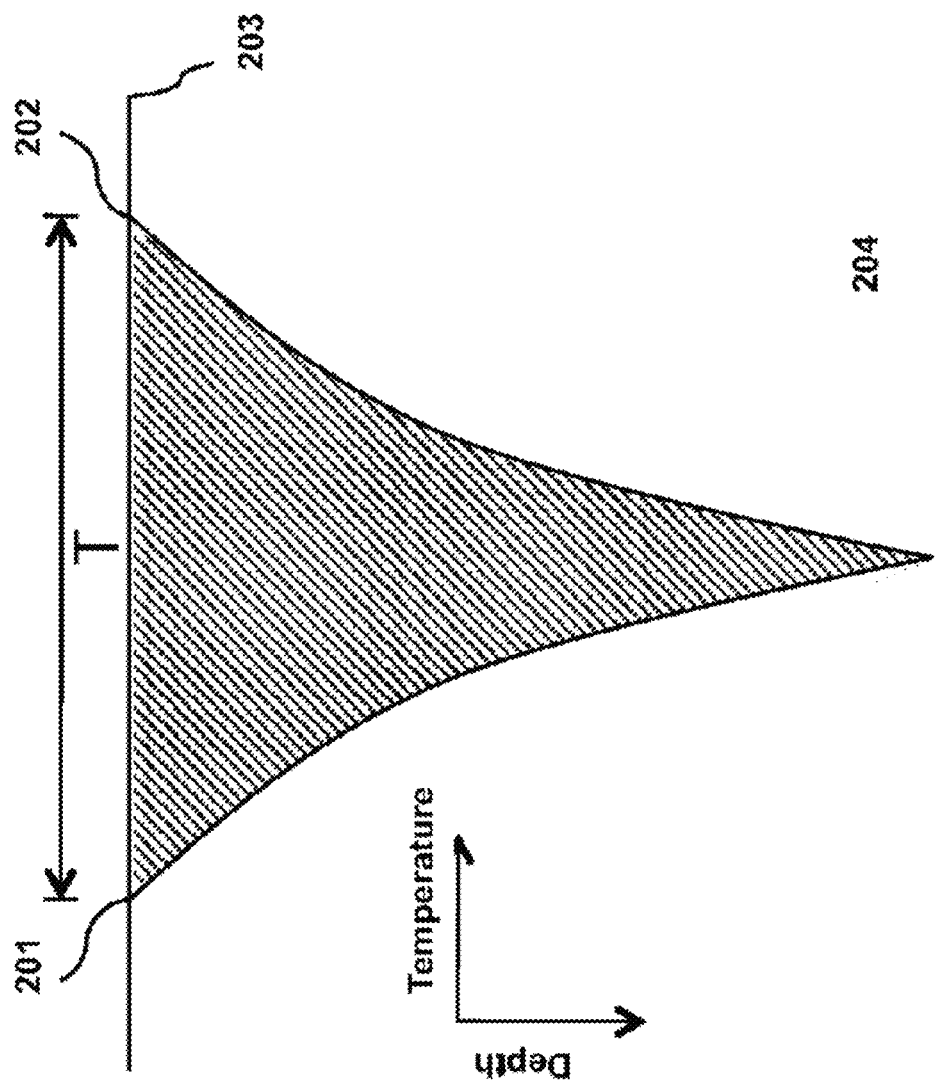

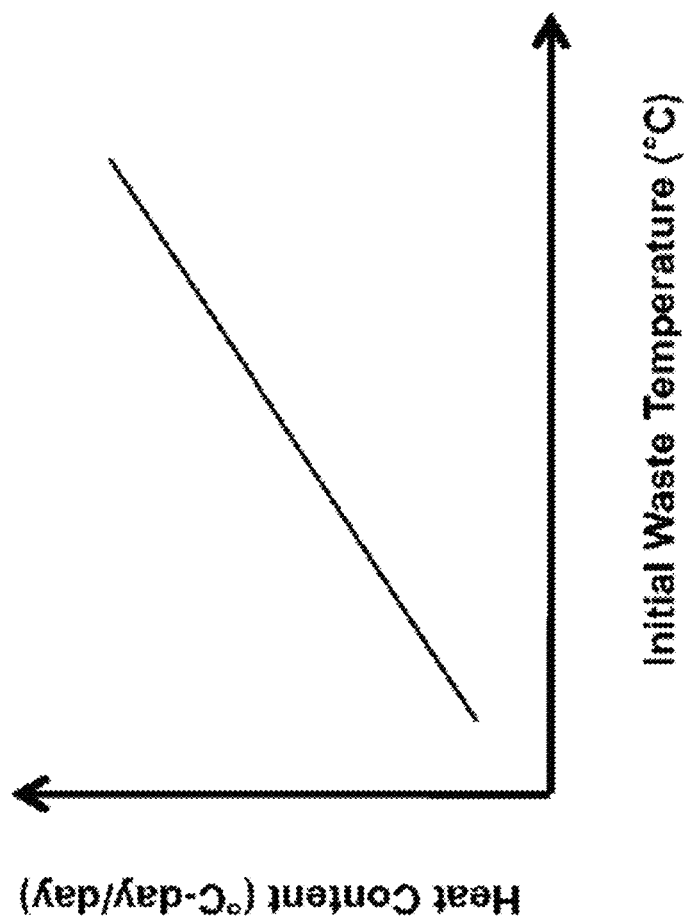

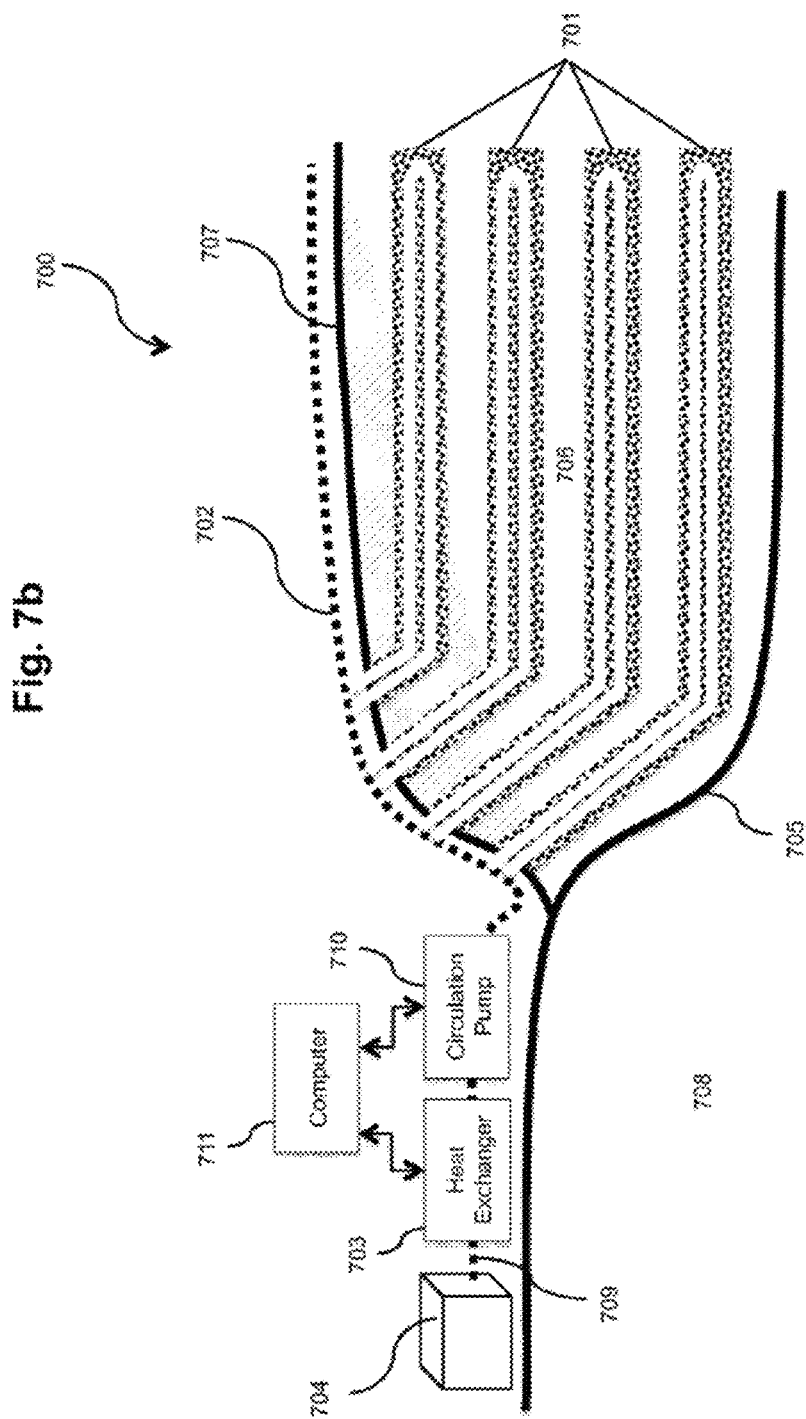

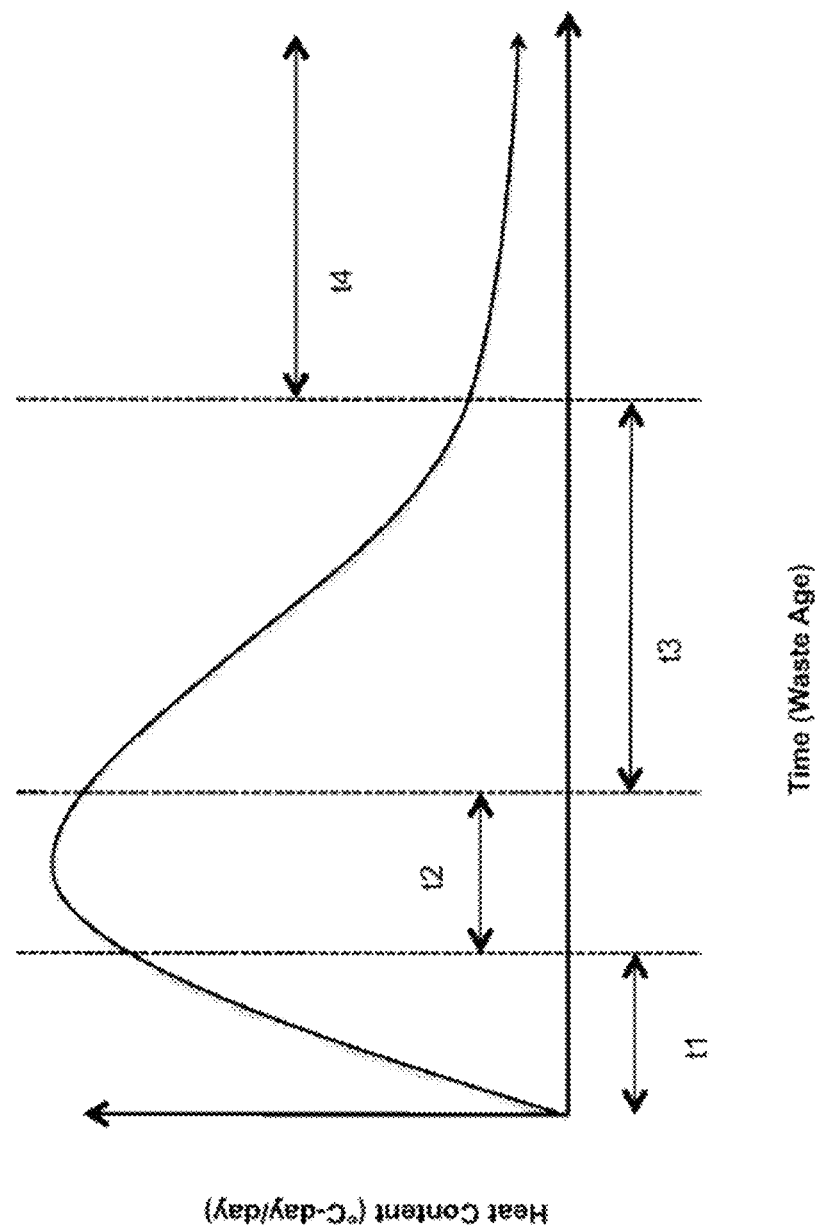

SYSTEMS AND METHODS FOR TEMPERATURE CONTROL AND HEAT EXTRACTION FROM WASTE LANDFILLS

CROSS-REFERENCE TO RELATED APPLICATIONS

The present application is a continuation-in-part of U.S. application Ser. No. 14/162,448, filed Jan. 23, 2014, which claims the benefit of U.S. application Ser. No. 13/190,313, filed Jul. 25, 2011 and issued as U.S. Pat. No. 8,672,586, which are hereby incorporated in their entirety by reference.

FIELD OF THE INVENTION

The field of the invention relates to systems and methods for temperature control and heat extraction, and more particularly to systems and methods for controlling and manipulating temperature and extracting heat from the degradation, decomposition, and chemical/biochemical transformation of municipal, industrial, and other types of waste.

BACKGROUND OF THE INVENTION

Continued increases in generation of industrial and municipal solid waste (MSW) has resulted in increased use of landfill sites worldwide. The U.S. Environmental Protection Agency estimates that the MSW generation in the U.S. is approximately 240 million tons (U.S. E.P.A. 2009). A significant portion of the waste is disposed of in landfills. As MSW landfills undergo normal operation, the primary byproducts of the landfill processes are heat, gas, and leachate (i.e., contaminated liquid generated due to passage of liquid through the waste mass). Significant amounts of other types of wastes such as industrial waste, agricultural waste, mining waste, and other types of wastes also are generated in the U.S. on an annual basis.

Turning to FIG. 1, an example of a typical waste landfill 100 is illustrated. Generally, a low permeability barrier 103 is placed over ground surface 105. The waste mass 101 is deposited and landfilled upon the barrier 103. Waste mass 101 may consist of, for example, alternating layers of soil and trash. The landfilled waste mass 101 is covered with a low permeability cover 102. The total depth 104 of waste landfill 100 varies, for example, between tens to hundreds of feet.

In the waste that is buried or landfilled, the organic components decompose resulting in generation of heat and gas that can be converted to usable energy. A considerable amount of energy is produced in this manner. In fact, a mid-sized landfill—such as the Riverview Landfill in Riverview, Michigan—can provide energy equivalent to 10,000 residential homes. A number of recognized techniques for effectively using landfill sites are based on, for example, collecting the gas produced from decomposed waste and converting to energy or maintaining conditions for recycling leachate. Furthermore, these techniques attempt to minimize both nearby contamination and atmospheric pollution.

For example, waste decomposition in a landfill produces an effluent gas, which contains about fifty percent (50%) methane ($CH_4$). This landfill gas in the interior of the landfill is often at a higher pressure than that of the surrounding atmosphere. Consequently, this pressure differential creates a migration pattern of the landfill gas towards both the surface (vertically) and near the edges/perimeter (horizontally) of the landfill. However, methane is an inflammable gas that not only can damage plants in a nearby area but also lead to a danger of explosion. Additionally, emission into the atmosphere of the landfill gas contributes to the "greenhouse effect" as a direct factor to abnormal climate phenomena. With respect to environmental pollution, where the level of methane contained in the landfill gas is in the amount of 50 to 60%, the influence on the "greenhouse effect" is approximately 21 times or greater compared to that of carbon dioxide ($CO_2$). However, as methane also has a beneficial combustion property, it is possible to collect the gas from a landfill to provide an efficient energy resource.

A conventional technique of controlling the withdrawal of gas from a landfill site is to drill deep vertical wells, such as well 106 in FIG. 1, into the landfill. These vertical wells are attached to a network of pipes and gas pumps (not shown) to vacuum/extract gas from the wells. An example of such a system implementing this technique is disclosed in U.S. Pat. No. 7,448,828, to Augenstein et al., filed Feb. 23, 2007 for a "Landfill design and method for improved landfill gas capture," which is hereby incorporated by reference in its entirety. This system contemplates an improved method for collecting landfill gas by minimizing the collection of atmospheric air with the gas.

Another example of effective landfill use controls gas generation rates of the landfill through leachate regulation. This technique involves regulating both temperature and pH levels of leachate to be recycled and continuously injected into a deposit of wastes. For example, see U.S. Pat. No. 6,334,737, to Lee, filed Dec. 17, 1999 for a "Method and apparatus of controlling landfill gas generation within a landfill," which is hereby incorporated by reference in its entirety. Monitoring and controlling a variety of conditions for recycling leachate provides the advantage of maintaining, as consistently as possible, the level of gas production during the landfill process.

Significant amount of research and development has been reported for gas and leachate. However, less information is available on heat generation in landfills. Elevated temperatures can affect the ongoing biochemical processes (e.g., decomposition) and mechanical and hydraulic properties/behavior of the wastes. Operational and climatic conditions have significant effects on heat generation and transfer in landfills. For example, see Yesiller et al., for "Heat Generation in Municipal Solid Waste Landfills" (Yesiller, N., Hanson, J. L., and Liu, W.-L., *Journal of Geotechnical and Geoenvironmental Engineering*, ASCE, Vol. 131, No. 11, p. 1330-44 (2005)) and Yesiller and Hanson, for "Analysis of Temperatures at a Municipal Solid Waste Landfill" (Yesiller, N. and Hanson, J. L. "Analysis of Temperatures at a Municipal Waste Landfill," *Sardinia* 2003, Ninth International Waste Management and Landfill Symposium, Christensen et al. Eds., CISA, Italy, p. 1-10 (2003)), which are hereby incorporated by reference in their entirety. These effects may be short-term (e.g., reaction rates) and/or long-term (e.g., microbial population balance within the waste). In general, waste decomposition rates generally increase with increased temperatures up to a point of killing microbial populations (e.g., approximately 70° C.).

Temperatures within landfills undergo seasonal fluctuations near the surface and edges/perimeter of the landfill due, in part, to conductive and convective heat transfer. Elevated temperatures are correspondingly observed within the landfilled mass at central locations. Accordingly, optimal decomposition and gas production conditions are not uniform within a landfill mass.

Current systems for energy extraction from MSW landfills focus on the generation and distribution of gas and leachate in landfills. However, such systems do not take advantage of a detailed analysis of spatial heat distribution or a long-term thermal trend of landfills. In addition, systems are not available for controlling and manipulating temperatures in landfills. Furthermore, current systems do not provide a method for creating a symbiotic energy source between the landfill and nearby facilities to create optimal operating conditions.

Accordingly, a system and method for controlling and manipulating temperatures and extracting heat from a landfill that considers heat generation and temperature distribution within a landfill is desired.

SUMMARY OF THE INVENTION

The field of the invention relates to systems and methods for heat exchange, and more particularly to systems and methods for controlling and manipulating temperature and extracting heat from the degradation, decomposition, and chemical/biochemical transformation of municipal, industrial, and other types of waste. In one embodiment, a temperature control and heat extraction system may include at least one heat exchange well providing a channel for a closed-loop fluid circulation piping that contains a first circulation fluid. The at least one closed-loop well extends throughout a waste mass. The closed-loop fluid circulation piping runs throughout the network of heat exchange wells and is fluidly coupled to a heat exchanger. The heat exchanger has a first inlet and outlet for the first circulation fluid and exchanges heat to a second circulation fluid through a second inlet and outlet. The system further includes a highly conductive granular backfill intermittently dispersed within the at least one fluid circulation well to provide a thermal encasing for said piping. The first circulation fluid is circulated, via a circulation pump operatively coupled to the piping, through the closed-loop circulation piping into various depths of the waste mass to transfer thermal energy from said mass to the heat exchanger.

In one embodiment, the waste mass has a first, second, third, and fourth life cycle stage of biochemical reactions. The transfer of thermal energy includes the steps of providing a first level of heat to the heat exchanger at the first life cycle stage of a waste mass, wherein the heat exchanger provides heat to said mass through the at least one closed-loop fluid circulation well; extracting heat from the at least one closed-loop fluid circulation well through the heat exchanger at the second life cycle stage of the waste mass; providing a second level of heat to the heat exchanger at the third life cycle stage of the waste mass; and maintaining a long-term heat exchange to or from the waste mass through the heat exchanger at the fourth life cycle stage of the waste mass.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 1 is a diagram of a municipal waste landfill known in the art.

FIG. 2b is a curve representing general earth temperature trends as a function of depth.

FIG. 4c is a curve representing heat content as a function of initial temperature of a waste mass.

FIG. 7b is another diagram of a heat exchange system in accordance with a preferred embodiment of the present invention; and FIG. 8 is a chart illustrating exemplary thermal exchange stages in accordance with a preferred embodiment of the present invention.

DETAILED DESCRIPTION OF THE PREFERRED EMBODIMENTS

As described above, heat is generated as a result of biochemical processes and decomposition of organic components in wastes as well as chemical/biochemical transformation of various components in wastes. Field measurements of temperatures within landfills reveal spatial variations of temperature as a function of depth.

Figure 2A:
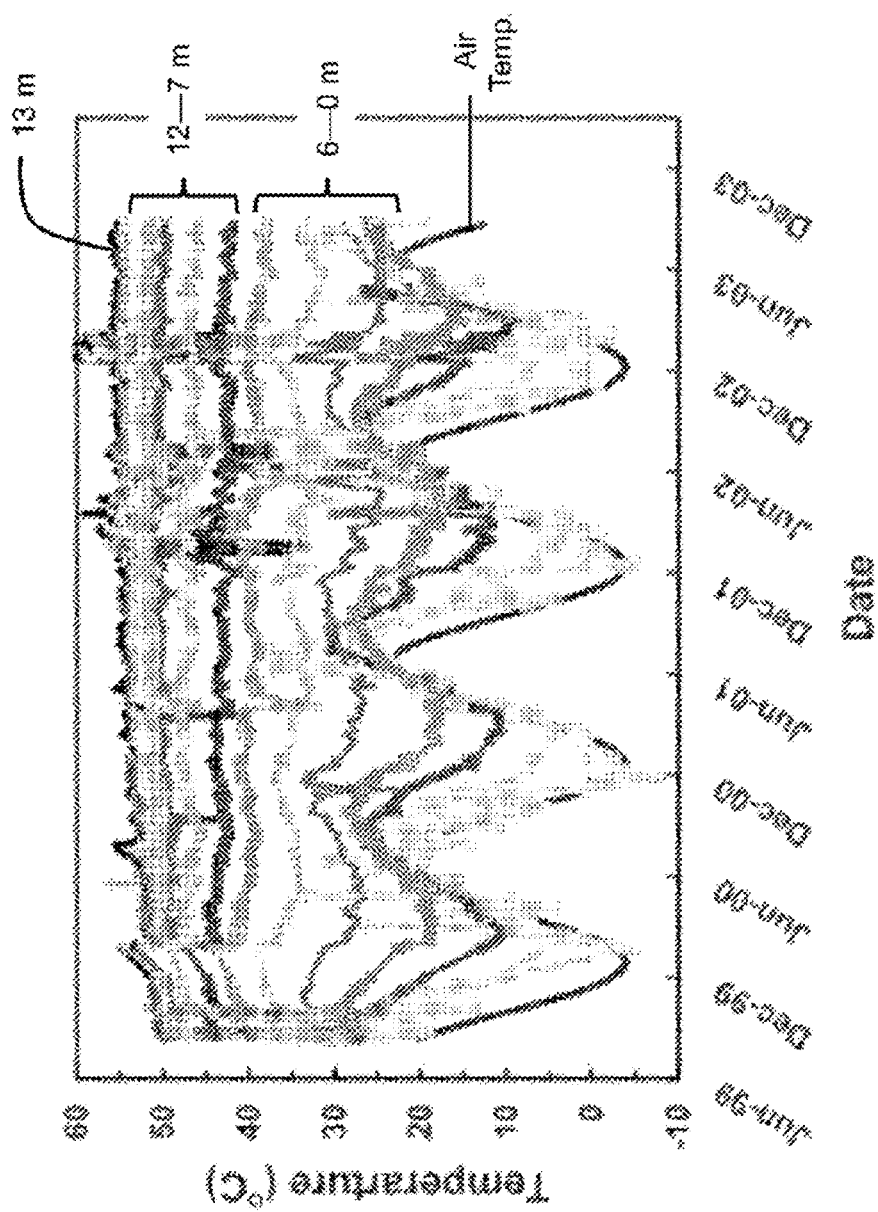
FIG. 2a is a chart representing measurements of temperatures at various depths within waste mass as a function of time.

FIG. 2a illustrates an example of temporal variations in temperature with location at a given depth of waste landfill 100. Temperatures at relatively shallow depths of waste mass 101 (e.g., at the surface as well as near the edges/perimeter of the waste mass) undergo seasonal fluctuation similar to variability in earth temperature, which is shown in FIG. 2b. Turning to FIG. 2b, ground surface 203 provides range T of temperatures from low temperatures 201 (e.g., 0° C.) to elevated temperatures 202 (e.g., 40° C.). Elevated temperatures approach temperature 204, which is the mean annual earth temperature, as the measurement depth increases. Range T of temperatures at ground surface 203 illustrates a similar trend in waste mass temperatures at shallow depths in FIG. 2a.

Conversely, stable, elevated temperatures (e.g., 50-60° C.) can be seen near mid-depth of landfill 100 in FIG. 2a (e.g., 13-9 meters). The seasonal variations of temperature within waste mass 101 decrease significantly at locations away from the edges of the landfill (e.g., 20 meters from air surface). These steady elevated temperatures also may increase over time.

At intermediate depths between the edges and center of waste mass 101, temperatures demonstrate phase lag as well as amplitude decrement in relation to ground-surface temperatures shown in FIG. 2b. Phase lag can represent the delay in timing of peak seasonal temperatures at a given depth relative to corresponding peaks at the ground surface. Amplitude can represent the one-half the maximum range of temperature measured in a single year.

Given a typical thermal gradient of waste mass 101 in FIG. 2a, heat gain in the waste compared to unheated (i.e., ambient) baseline conditions can be determined. This difference between measured waste temperature, as shown in FIG. 2a, and unheated baseline waste temperature at equivalent depths is known as the Heat Content (HC) of the waste mass. Specifically, HC represents the average temperature differential of the waste mass as compared to unheated conditions. In order to determine the HC, the baseline waste temperatures can be determined using equation (1), which is an analytical formulation for ground temperature at any depth on any calendar day.

$$T_{(x,t)} = T_m - A_s e^{-x\sqrt{\frac{\Pi}{365\alpha}}} \cos\left[\frac{2\Pi}{365}\left(t - t_0 - \frac{x}{2}\sqrt{\frac{365}{\Pi\alpha}}\right)\right] \quad (1)$$

where:
$T_{(x,t)}$=temperature (° C.) at depth, x and at time, t
$T_m$=mean annual earth temperature (° C.)
$A_s$=amplitude of surface temperature wave (° C.)
x=depth below surface (m)
α=thermal diffusivity (m²/day)
t=time of year, days (where 0=midnight December 31)
$t_0$=phase constant (34.6 days)

Analytical and numerical approaches have been developed for modeling temperatures in municipal solid waste landfills with heat generation in wastes due to decomposition, underlying native soil conditions, and overlying seasonal air temperature fluctuations. A typical example of thermal modeling for various landfill sites is contained in a study from Hanson et al for an "Analytical and Numerical Methodology for Modeling Temperatures in Landfills" (Hanson, J. L., Liu, W.-L, and Yesiller, N., *Proceedings of Selected Sessions of GeoCongress* 08: *Geotechnics of Waste Management and Remediation*, ASCE GSP No. 177, Khire et al., eds., ASCE, Reston, Va., p. 24-31 (2008)), which is hereby incorporated by reference in its entirety. In determining a baseline ground temperature profile in a landfill application, thermal diffusivity (α) values between approximately $3\times10^{-7}$ m²/sec to $7\times10^{-7}$ m²/sec can be used for an equivalent waste mass that is not undergoing seasonal temperature variations and not gaining heat due to biochemical decomposition.

Figure 3:
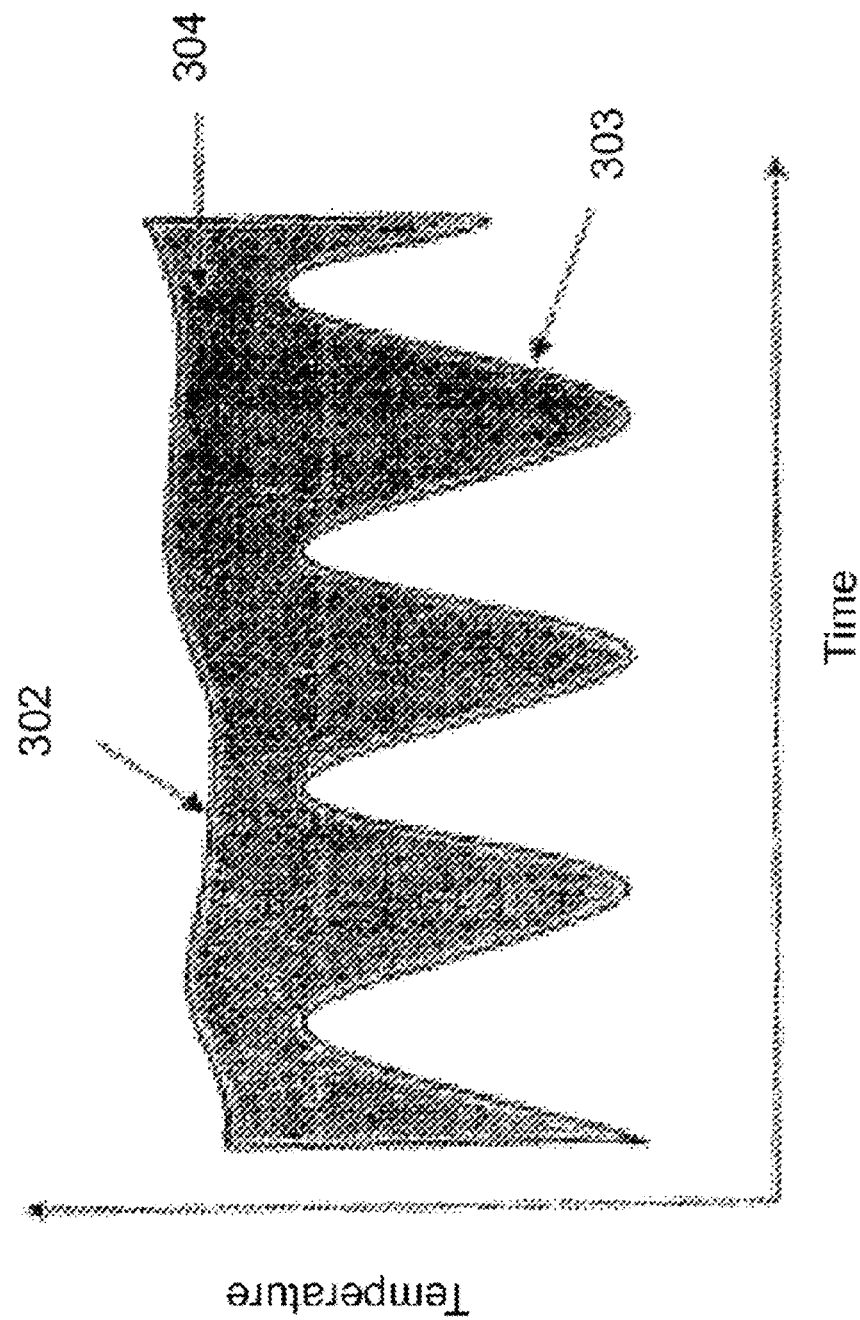
FIG. 3 is a chart illustrating measured temperatures and analytically calculated temperatures within waste mass as a function of time.

With reference to FIG. 3, the HC of a landfill site can be determined by calculating the area between the time-temperature curves of the measured waste temperatures and the analytical baseline unheated waste temperatures governed by equation (1). FIG. 3 illustrates a typical temperature change within waste over time. Temperature curve 302 represents a measured temperature within waste mass 101, using sensor arrays or other suitable measurement tools, at a given depth. For example, Type K thermocouples deployed in custom-fabricated flexible sensor arrays ranging from a length between 1 and 60 m for vertical installations and between 150 and 200 m for horizontal installations may be used. These sensors provide high resistance to chemical environments and are well suited for landfill applications. Additional information regarding sensor arrays can be found in an article for "Spatial and Temporal Temperature Distributions in Municipal Solid Waste Landfills" (Hanson, J. L., Yesiller, N., and Oettle, N., *Journal of Environmental Engineering* ASCE, Vol. 136, No. 8, p. 804-814 (2010)), which is hereby incorporated by reference.

Temperature curve 303 provides equivalent ambient waste temperatures at the specified depth, calculated using the analytical solution (1) discussed above. As can be seen in FIG. 3, shaded area 304 represents the area between temperature curves 302 and 303, which provides the total heat gain due to biological and chemical activity of waste mass 101 in units of degree-days. Furthermore, shaded area 304 can be divided by the duration of the analysis period to normalize HC with respect to time. The resulting calculation provides HC as a time weighted average of the change in temperature from unheated conditions in units of degrees-centigrade day per day (° C. day/day). Accordingly, this calculation provides heat gain in waste mass 101 due to, for example, decomposition, rather than the effects of seasonal/climatic variation of temperature occurring at the given depth.

Figure 4A:
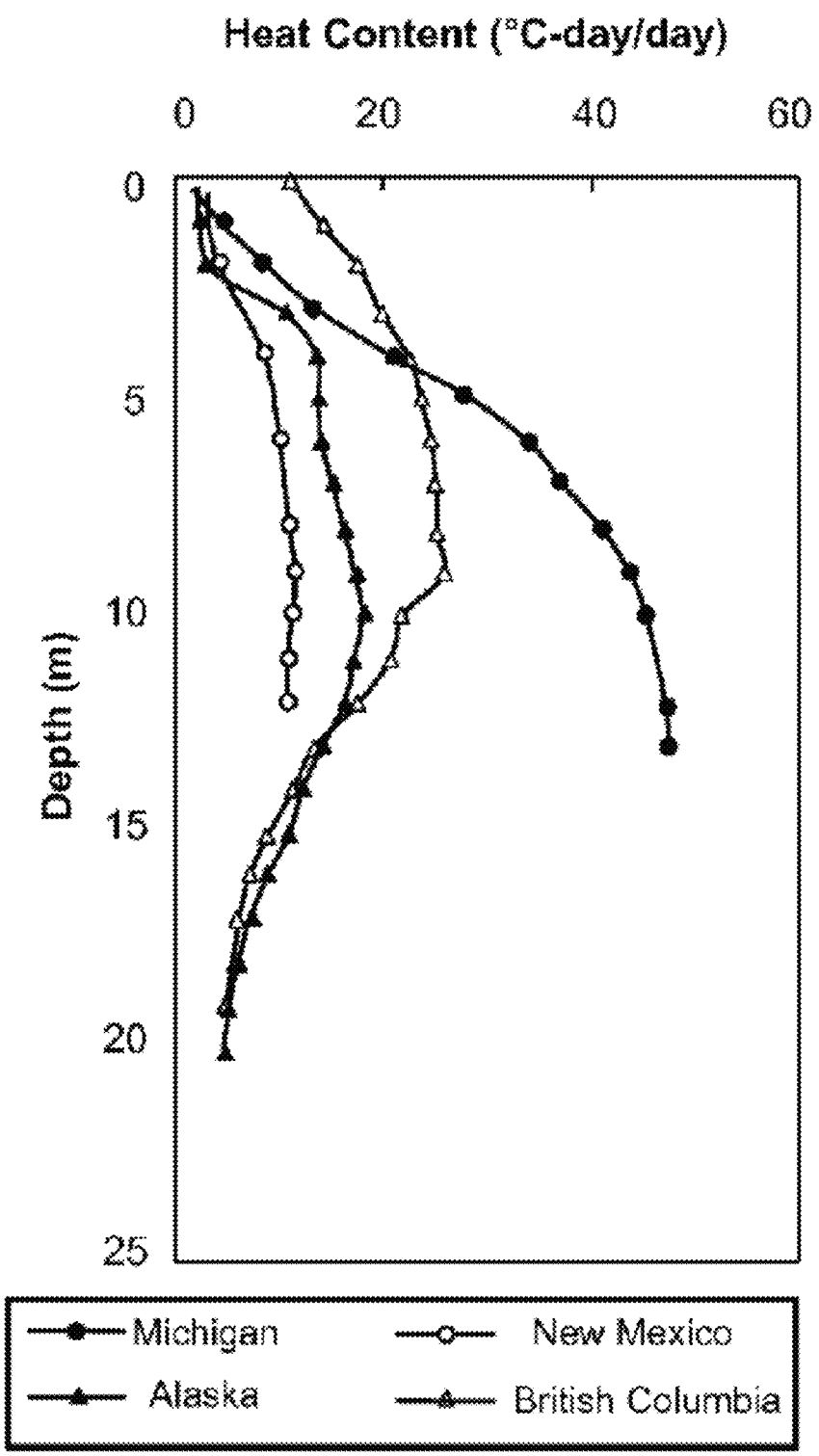
FIG. 4a is a chart representing a series of measured heat content within waste mass for various sites as a function of depth.

The analysis of HC for various locations reveals that higher HC can be found in the central core of waste mass rather than near the edges, top surfaces, and bases of waste mass 101, as illustrated in FIG. 4a. FIG. 4a provides typical examples of the variation of HC as a function of the depth of the sensors in the waste mass 101. The curves in FIG. 4a demonstrate elevated heat content near central depths of waste mass. In each of these measurements of HC, the HC is linearly related to the initial waste temperature and waste placement rate (m/year). FIG. 4c shows the general relationship between measured HC values as a function of the initial waste temperature.

Figure 4B:
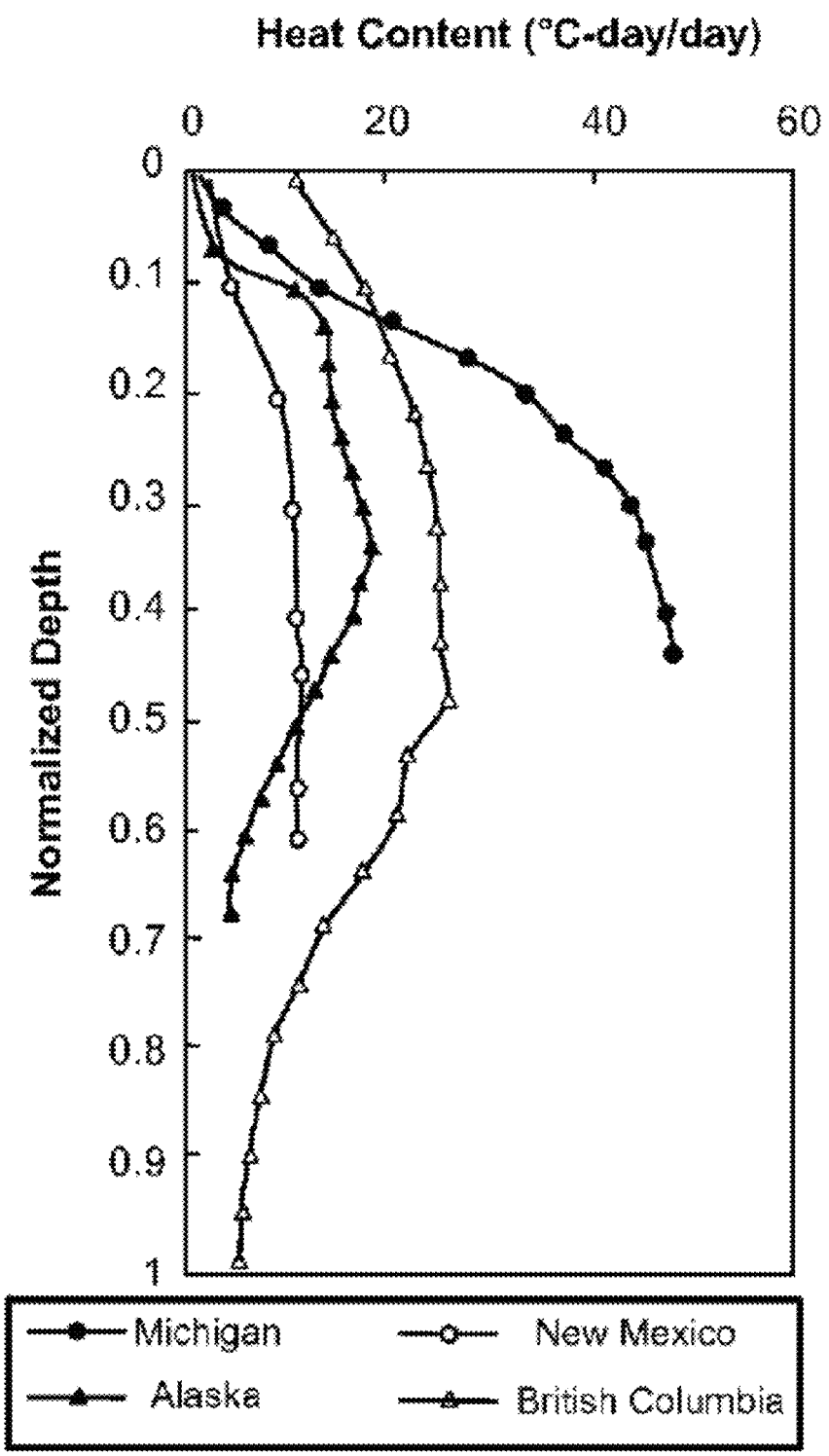
FIG. 4b is another chart representing a series of measured heat content within waste mass for various sites as a function of normalized depth.

FIG. 4b represents the measurements of HC as a function of the respective normalized depth—the ratio of the depth of the measurement over the total depth to linear 104. The curves of FIG. 4b verify that the peak HC occurs at normalized depths near the mass-center (i.e., normalized depth near 0.5).

Using common exponential growth and decay functions, it is then possible to model the relationship between HC and the life cycle of a landfill (i.e., time representing the age of waste). Specifically, equation (2) was developed in the form of the Streeter-Phelps approach (presented in Vesilind, P. A., 1997, *Introduction to Environmental Engineering*) for modeling HC as a function of time for waste.

$$HC = \frac{a\psi}{(b-a)}(e^{-at_w} - e^{-bt_w}) \quad (2)$$

where:
HC=heat content (° C.-day/day)

a=heat generation constant (day$^{-1}$)
b=heat utilization constant (day$^{-1}$)
ψ=heat production potential (° C.-day/day)
$t_w$=waste age (year)

Figure 5:
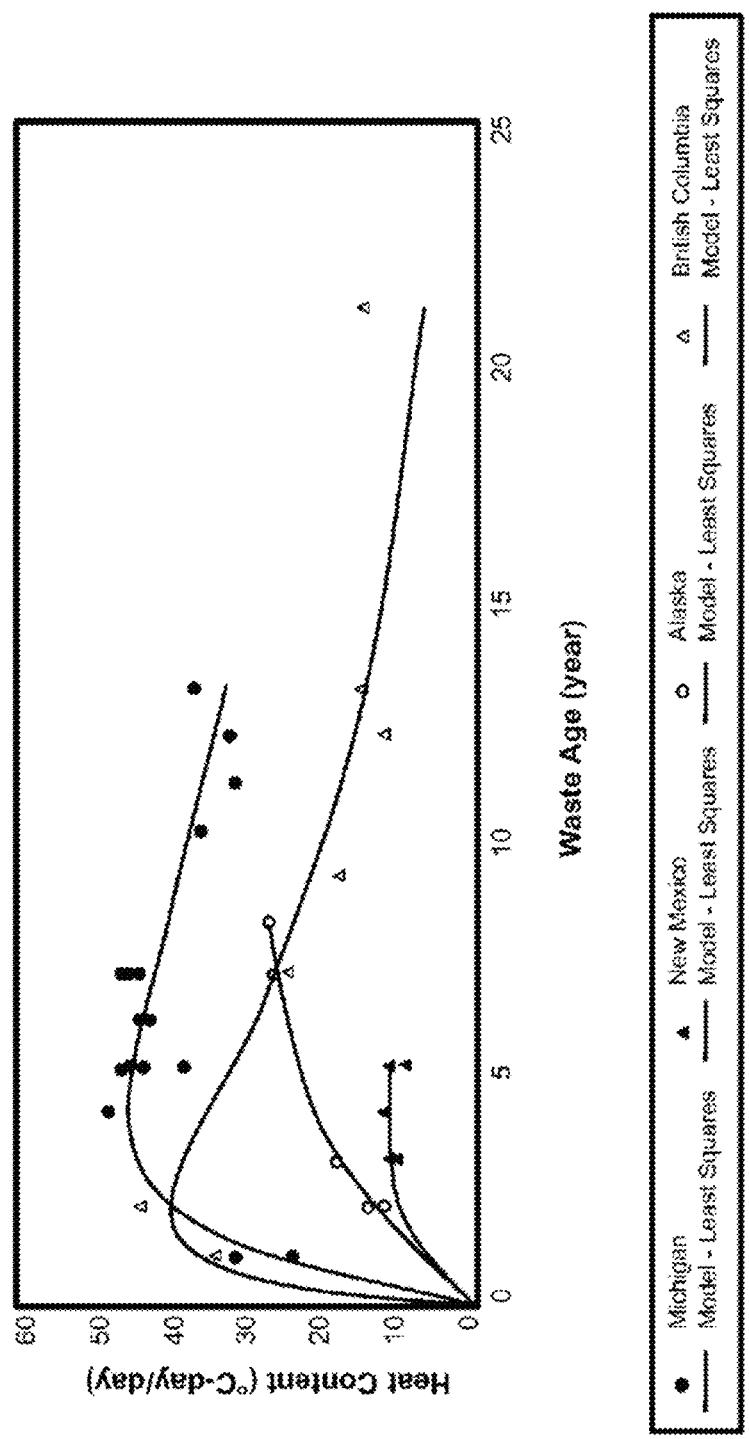
FIG. 5 is a diagram representing the trend of heat content for various sites as a function of waste age.

Examples of the model curve generated by equation (2) for sites measured in FIG. 4a are illustrated in FIG. 5. FIG. 5 shows the variation of the maximum HC with waste age for various sensors. In general, HC can be seen to increase in a first life cycle of waste degradation (e.g., 2 to 4 years for a landfill in a humid continental temperate climate) followed by a period of decrease at a slower rate to a stable low value of HC.

HC also may be used to determine heat generation of the waste mass. Heat generation is defined as the energy required to raise the temperature of the waste mass and can be determined using the heat capacity of the waste, the magnitude of temperature increase of the waste, the evaporation of water into the landfill gas phase, the temperature of the biochemical reactions, and the heat loss to the surrounding environment. This energy production can be calculated using equation (3).

$$E = \sum_{i=1}^{n} \Delta T_i c M(T)_i \quad (3)$$

where:
E=energy production (heat generation, MJ/m$^3$)
$\Delta T_i$=increment of temperature rise for waste (K)
c=heat capacity of waste (MJ/m$^3$K)
$M(T)_i$=fraction of energy released that is used for heating a landfill In order to determine heat generation for various representations of HC, for example, those curves represented in FIG. 4, the peak HC for a given location can be used as the magnitude of temperature increase of the waste. In this example, with references to FIG. 4 and equation (3), the energy produced E for HC measurements in FIG. 4 range from 23 and 77 MJ/m$^3$ for the various sites. Similar to the results illustrated in FIG. 5, variations in energy produced E occurs as a function of waste age. Additionally, energy E peaks and heat content HC peaks are also similar in timing.

Figure 6A:
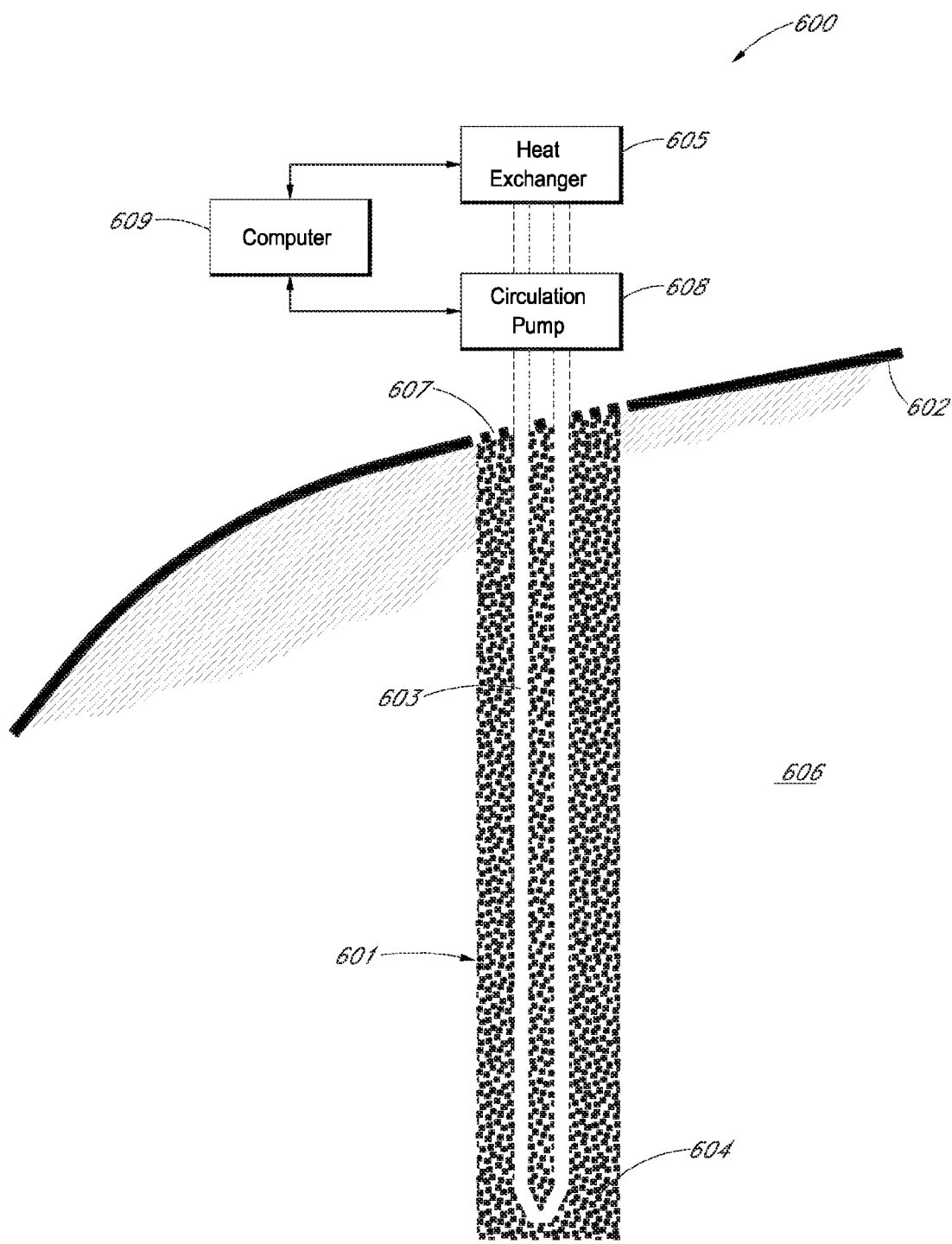
FIG. 6a is a diagram of a heat exchange system in accordance with a preferred embodiment of the present invention.

Despite low permeability cover 102 used in most landfill sites and the relatively high insulating quality of MSW, heat loss to the surrounding environment should be considered in a determination of heat generation. For example, from a central core of waste mass (i.e., the location of the highest HC) to an average annual air temperature location (e.g., landfill cover 102) and subgrade 10 m below the barrier at mean annual earth temperature, the magnitude of conductive thermal losses to the surrounding environment can range between 42 and 139 MJ/m$^3$-year for losses towards the cover and atmosphere (upward losses) and between 6 and 152 MJ/m$^3$-year for losses towards the barrier and subgrade (downward losses). Similarly, convective losses, for example, through leachate records, may range between 0 and 11 MJ/m$^3$-year. As discussed above, biochemical processes of waste decomposition varies as a function of temperature. Current systems attempt to extract energy from landfills through the control of the gas production in landfill sites. Temperature conditions may affect the rate at which these systems produce usable gas; however, as decomposition produces heat, alternative uses for the heat energy are typically not utilized. One approach that benefits from the elevated temperature conditions discussed above is shown in FIG. 6a, which shows system 600 for heat exchange in accordance with an embodiment of the present invention. The system 600 preferably includes at least one heat exchange well 601 extending throughout waste mass 606. Heat exchange well 601 provides a channel for closed-loop fluid circulation piping 603, which is routed below ground surface 602 through heat exchange well 601. In one embodiment of the present invention, the portion of piping 603 submerged below ground surface 602 may be of cross-linked polyethylene (PEX), high density polyethylene, copper, or other metal, plastic, or composite materials. Composite materials can include metal and plastic combinations or fiber composites such as glass fiber or carbon fiber. In some embodiments, carbon fiber reinforced polymer and glass fiber reinforced polymer can be used. Such piping provides durability in a chemically aggressive environment, resistance to heat, and flexibility for both differential movements within waste mass 606 and seismic deformations in waste mass 606. However, it is also appreciated by one of ordinary skill that the piping 603 may also be of any material suitable for heat exchange.

Figure 6B:
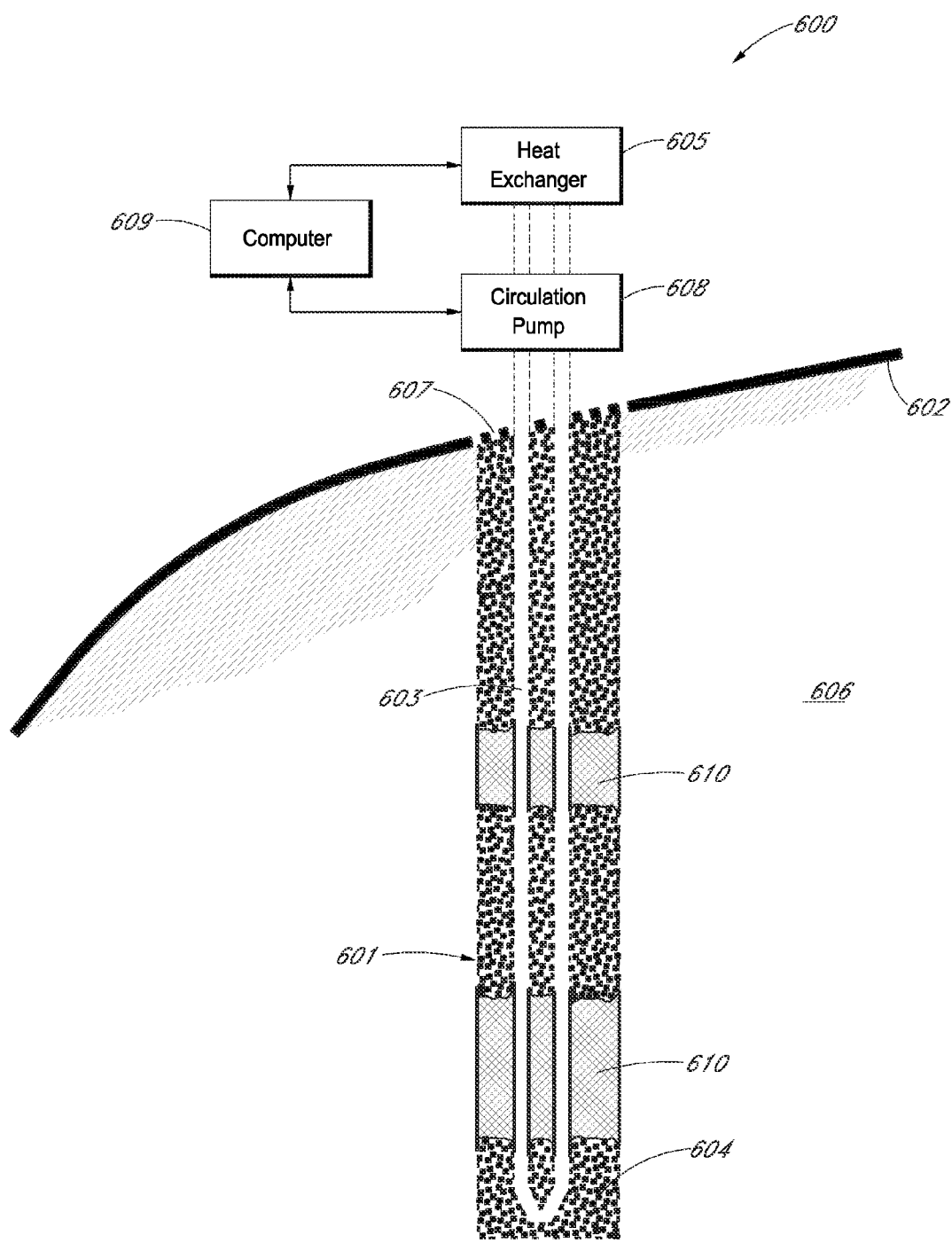
FIG. 6b is a diagram of a heat exchange system in accordance with a preferred embodiment of the present invention.

Additionally, the annular space surrounding piping 603 within heat extraction well 601 may be filled with a highly conductive granular backfill 604 (e.g., dense gravel, soil, or industrial byproduct such as foundry sand, cement kiln dust, recycled concrete aggregate, steel slag, fly ash, blast furnace slag, metal processing wastes, industrial sludges, mining wastes, waste rock, and heavy construction/demolition debris, etc.) to provide a material with high thermal conductivity for efficient heat transfer between the fluid circulated in said piping 603 (not shown) and waste mass 606. An insulating seal 607 is applied at the surface 602 of well 601 to prevent convective thermal losses. The piping 603 extends beyond ground surface 602 and is fluidly coupled to circulation pump 608 and heat exchanger 605. In one embodiment, the portion of piping 603 above ground surface 602 may be metal to provide UV resistance. Circulation pump 608 provides fluid flow through the system 600 such that circulated fluid through piping 603 conductively transports heat from within waste mass 606 to heat exchanger 605. FIG. 6b shows an example embodiment where the annular space surrounding piping 603 within heat exchange well 601 may be filled at intervals with highly conductive backfill 604 to provide a material with high thermal conductivity for efficient heat transfer between the fluid circulated in said piping 603 (not shown) and waste mass 606. Also included at intervals can be a highly insulative fill 610. Examples of highly insulative fill 610 can include byproducts such as shredded tires, processed mattresses and furniture, textiles, lightweight construction or demolition debris, auto shredder fluff, packaging materials (e.g., packing peanuts, bubble wrap, corrugate), shredded paper, organic agricultural wastes, green wastes, and agricultural plastics. Intervals of conductive and insulative materials are provided to localize effects of thermal transfer. The configuration of backfill (conductive versus insulative) can be varied over time to create desired thermal transfer conditions. For instance conductive and insulative fill can be added, removed and shifted to suit conditions as appropriate depending on weather, time (seasonally, monthly, weekly, diurnally or otherwise), age of the waste mass, desired treatment of the waste mass and others. References to intermittent elsewhere in this document should be understood to mean at intervals as described in this paragraph. In some embodiments intervals of highly conductive and highly insulative backfill can be similarly sized or uniform. In some embodiments intervals can be non-uniform. In some embodiments a single type of highly conductive or highly insulative backfill can be used exclusively in a heat exchange well 601 while in other embodiments multiple types of highly conductive or insulative backfill can be used as appropriate to achieve the desired heat exchange characteristics. In some embodiments multiple types of highly conductive backfill can be combined in a single interval while in other embodiments a single type of highly conductive backfill can be used in a single interval. In some embodiments multiple types of highly insulative backfill can be combined in a single interval while in other embodiments a single type of highly insulative backfill can be used in a single interval.

Figure 6C:
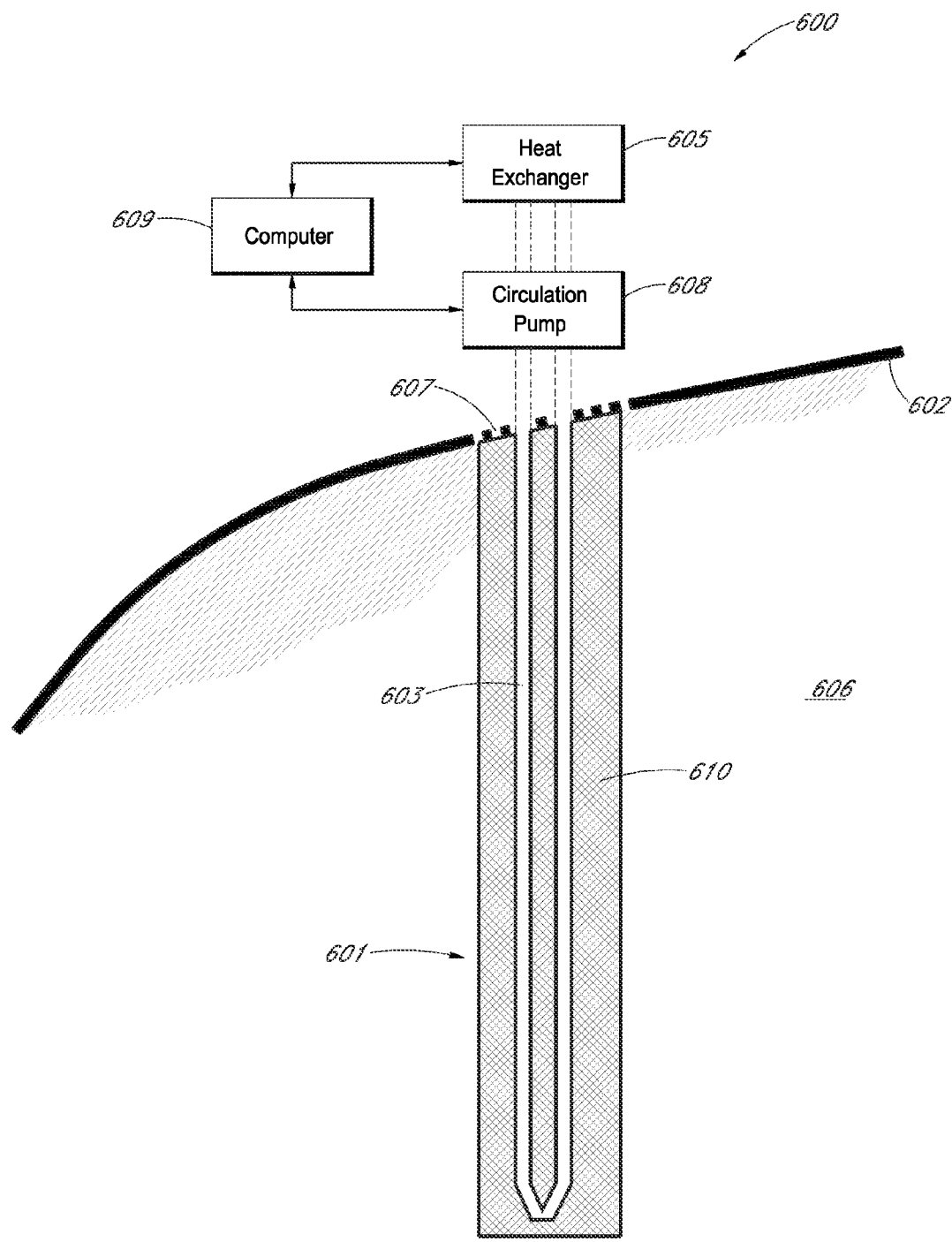
FIG. 6c is a diagram of a heat exchange system in accordance with a preferred embodiment of the present invention.

FIG. 6c shows an example embodiment where the annular space surrounding piping 603 within heat exchange well 601 may be filled with highly insulative backfill 610. In some circumstances it can be desirable to slow the heat transfer process. In some circumstances it can be desirable to fill the annular space surrounding piping 603 when the heat exchange process is no longer beneficial.

At ground surface 602, heat can be provided to heat exchanger 605 as an alternative source of energy. In one embodiment of the present invention, a typical heat exchanger 605 may be a plate and frame heat exchanger that includes a plurality of heat transfer surfaces (not shown) for exposing the heated processed fluid to a second fluid (circulating outside waste mass 606). The heat exchanger 605 further includes a housing having a process fluid inlet and a process fluid outlet for piping 603.

In operation, the piping 603 conductively transports heat in a closed-loop system. Processing fluid (not shown) passes through piping 603 downwardly into waste mass 606 to conductively transfer elevated heat upwardly from central depths to the ground surface 602. It is also appreciated by one of ordinary skill that the process fluid could also flow laterally or at an angle, depending on the orientation of heat extraction well 601 and heat exchanger 605.

A closed-loop system provides heat while reducing public and regulatory concern. The fluid used for circulation in piping 603 as well as other fluids used in the system are self-contained and avoid exposure to contaminants throughout the process. In one embodiment of the present invention, the circulation fluid may be water, which provides a high heat capacity for efficient thermal exchange, propylene glycol, which prevents the fluid from freezing near surface temperatures in colder atmospheric climates, or a water-glycol mixture. For systems using water as a circulation fluid, thermostat-controlled trace heaters (not shown) may be used to avoid freezing of the fluid in system components located above a frost line.

A microprocessor computer 609 coupled to both the heat exchanger 605 and circulation pump 608 may be used to monitor and control pumping rates and thermal energy transfer in the system. The computer 609 can receive and manipulate signals including, for example, temperature, position, flow-rate, and time related to the circulated fluid and waste mass via a network of sensors (not shown) integrated into piping 603 and throughout waste mass 606 electronically coupled to computer 609. Conventional sensors with means for measuring temperature, position, time and flow-rate can be used to provide computer 609 with control signals relating to the circulated fluid and waste mass 606. For example, as discussed above, Type K thermocouples deployed in custom-fabricated flexible sensor arrays may be installed and coupled to computer 609.

Figure 7A:
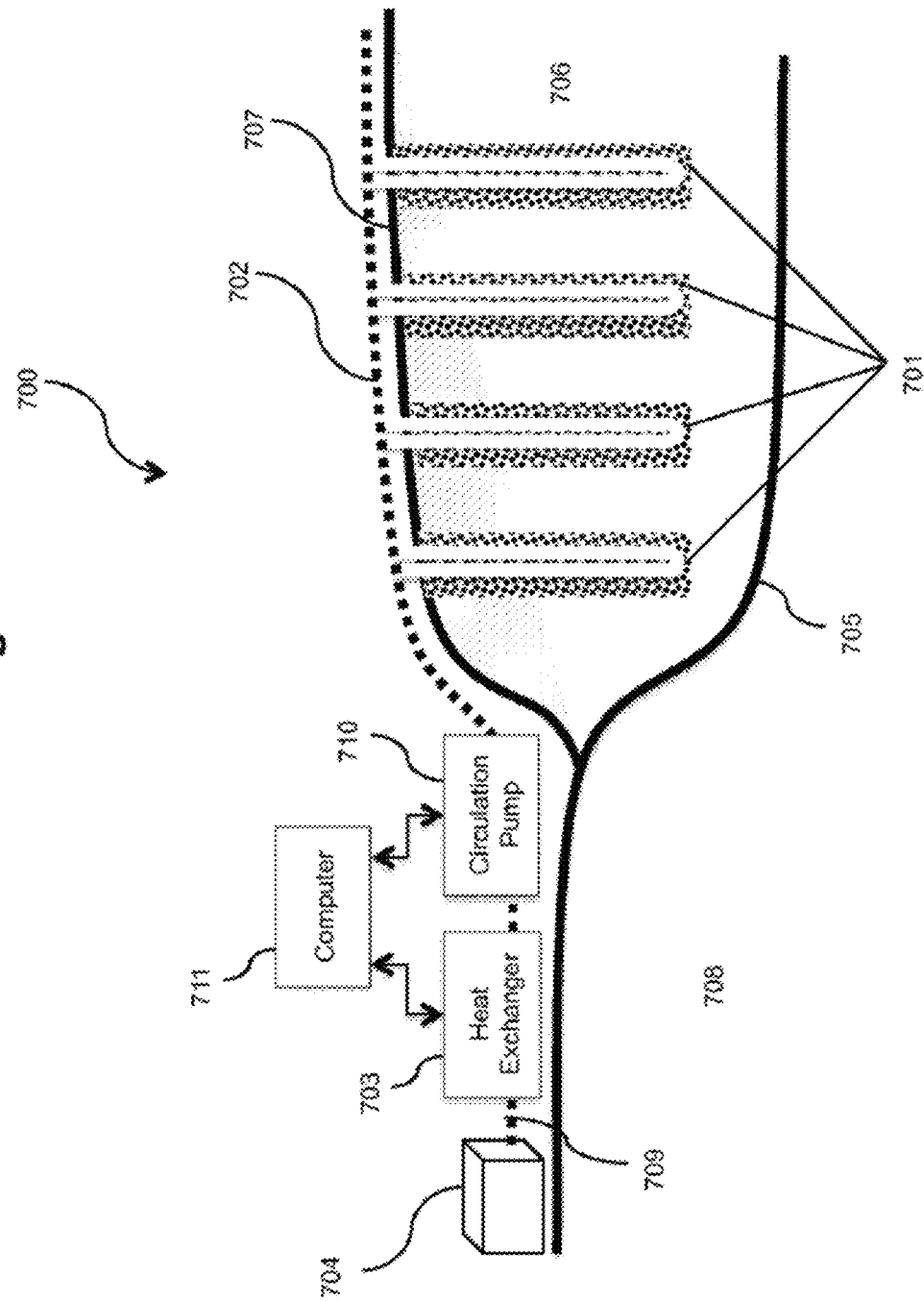
FIG. 7a is another diagram of a heat exchange system in accordance with a preferred embodiment of the present invention.

The present invention provides an alternative heat source that may be used, for example, by a nearby industry, landfill office, maintenance garage, scale house, or other industrial, commercial, or residential facility. In an alternative embodiment of the present invention, FIG. 7a illustrates system 700 that provides another application for heat extraction. Similar to heat extraction well 601 of system 600, system 700 uses a network of heat extraction wells 701 each providing a channel for a closed-loop circular piping system oriented throughout waste mass 706. In one embodiment, heat extraction wells 701 extend vertically into waste mass 706; however, wells 701 may also extend horizontally throughout waste mass 706, as shown in FIG. 7b, such that circulated fluid flows laterally into waste mass 706. Similarly, wells 701 may also be placed at an incline (not shown) into waste mass 706. For wells that are installed horizontally or at an angle, placement of wells 701 would occur in stages as waste mass 706 is landfilled onto barrier 705. This allows waste mass 706 to cover wells after installation. For wells that extend vertically into waste mass 706, installation may occur during waste placement or even after landfilling of waste mass 706 is complete.

Each well of network 701 may be filled with a highly conductive granular backfill and covered with an insulating seal as described in system 600. A barrier 705 is shown to sit upon native subgrade soils 708. Waste mass 706 is landfilled onto barrier 705 and covered by a low permeability cover 707. The network of heat extraction pipes channeled through wells 701 are jointly and fluidly coupled to an integrated surface piping system 702. The surface piping 702, represented by dotted lines, provides a communal channel for transporting processed fluid (not shown) to heat exchanger 703, located above surface 708. It should be appreciated by one of ordinary skill that surface piping 702 or heat exchanger 703 are not limited to placement above ground surface 708 and may be partially or fully located below ground surface 708. Circulation pump 710 is coupled to piping 702 to provide fluid flow throughout the closed loop system 700. In one embodiment, pump 710 is interposed between the heat extraction wells 707 and heat exchanger 703; however, circulation pump 710 may also be placed along circulation piping routed into wells 707 to provide fluid flow throughout the system 700.

A microprocessor computer 711 coupled to both the heat exchanger 703 and circulation pump 710 may be used to monitor and control pumping rates and thermal transfer rates in the system. The computer 711 can receive and manipulate signals including, for example, temperature, position, flow-rate, and time related to the circulated fluid via a network of sensors (not shown) integrated into piping 702, circulation piping routed into wells 707, and waste mass 706.

The processing fluid circulated through piping 702 and throughout wells 701 is self-contained. Thermal energy transferred to heat exchanger 703 may provide heat to nearby facility 704 through a second fluid (not shown) passing through surface or subsurface piping 709. As discussed above, facility 704 may be, but is not limited to, the landfill office operating system 700, a maintenance garage, or a nearby industrial, commercial, or residential facility.

Heat extraction system 700 also provides the means for creating a symbiotic relationship between facility 704 and waste mass 706. While elevated heat may be transferred as an alternative energy source from waste mass 706 to facility 704, heat conversely may be transferred from facility 704 to waste mass 706. This technique has the advantage of accelerating gas and heat production in the landfill because waste decomposition rates generally increase with increased temperatures. As discussed with reference to FIG. 4c, HC is linearly related to initial waste placement temperatures. Elevated HC values occur where the initial waste temperatures are also increased. Therefore, in order to elevate the initial waste temperature at a landfill, system 700 may also be used to provide additional heat to waste mass 706.

Facility 704 may provide thermal energy to heat exchanger 703 through piping 709. The heat transferred to the integrated surface piping 702 can be conductively distributed throughout heat extraction wells 701 to waste mass 706. Effectively controlling the HC of waste mass reduces lag time between waste placement and optimal gas extraction. The result is such that waste mass could approach optimal heat and gas production levels rapidly after waste placement at varying temperatures of the initial waste. An example is provided with reference to FIG. 8.

Turning to FIG. 8, a more generalized trend of heat content as a function of waste age is shown. As discussed above with reference to FIG. 5 and equation (2), HC increases in the first stage of the landfill life cycle t1. During period t1, gas production rates also begin to increase (not shown) until the HC reaches an elevated peak value characterizing a second stage of the landfill life cycle t2. Similarly, the heat generated and gas production levels (not shown) also peaks during t2. Following this period of optimal performance of the landfill, HC decreases during a third stage t3 of the landfill life cycle until a stable lower value of HC, which ultimately approaches ambient conditions, is reached in the fourth stage t4.

Preferably, the optimal performance of a landfill is described by the most efficient thermal conditions for heat and gas production levels. For example, an optimal temperature for growth of mesophilic bacteria is approximately 35-40° C. The optimal temperature range for growth of thermophilic bacteria is approximately 50-60° C. Similar to the optimum mesophilic range, optimal conditions for landfill gas production—most notably, of methane—occurs between 34-41° C. These temperature ranges provide targets for optimal performance of a landfill relative to gas production capacity. A system, such as system 700, that supports thermal heat exchange can obtain these conditions in waste mass 706 at an accelerated rate. Once the landfill reaches a stable stage of heat production, the system may return to providing heat from waste mass 706 to facility 704, thereby creating a symbiotic relationship benefiting both waste mass 706 and facility 704. Preferably, the symbiotic process would operate as follows.

In FIG. 8, during the early stage t1 of a landfill life cycle, both HC and gas production rates increase. In one embodiment of controlling the temperature of waste mass 706, facility 704 can provide additional heat to heat exchanger 703 through piping 709 during t1. Heat is exchanged to integrated surface piping 702 and can be circulated through network 701 of heat exchange wells to provide additional heat to waste mass 706. This additional heat can accelerate heat generation (and therefore increase HC) and gas production rates similar to providing an electrical "jumpstart" to a battery of an internal combustion engine vehicle. Once peak performance of the landfill begins in stage t2, a symbiotic relationship may begin such that waste mass 706 can return heat to facility 704 and provide a long-term source of thermal energy for use in industrial heating. However, as discussed above, following the peak performance of the landfill in stage t2, HC of the waste mass 706 may begin to decrease during stage t3 until a stable lower level is reached in t4. This decrease may benefit from additional heat exchange from facility 704. Providing heat to waste mass 706 once again during stage t3 may reduce the rate at which heat generation and gas production levels are decreasing, thereby prolonging the optimal productive stage of the landfill prior to reaching stage t4. When the landfill eventually approaches the stable levels of stage t4, system 700 can provide a constant source of heat to facility 704 from waste mass 706. For example, waste mass 706, having a stable elevated temperature measured at mid-depth, can heat a fluid circulating in the network of heat exchange wells 701 to a constant temperature above ambient temperature conditions. Depending on seasonal climate fluctuations, this heated fluid can proceed through integrated surface piping 702 towards heat exchanger 703 to be used for heating or cooling of facility 704. The production of a constant source of heat creates a renewable energy source similar to a conventional ground heat source pump.

In an alternative embodiment of controlling temperature, during the early stage t1 of a landfill life cycle, facility 704 can instead provide cooler temperatures to heat exchanger 703 through piping 709. This cooler temperature is exchanged to integrated surface piping 702 and can be circulated through network 701 of heat exchange wells to cool temperatures within waste mass 706. Unlike providing additional heat, as described above, this cooling effect can delay heat generation (and therefore postpone elevated HC) and gas production rates. This would provide an opportunity to delay significant capital expenditure, for example, associated with construction of a gas collection system during this time. Once peak performance of the landfill begins in a delayed stage t2, a symbiotic relationship may begin, similarly as discussed above, such that waste mass 706 can return heat to facility 704 and provide a long-term source of thermal energy for use in industrial heating. Following the peak performance of the landfill in stage t2, HC of the waste mass 706 may begin to decrease during stage t3 until a stable lower level is reached in t4. This decrease may benefit from additional heat exchange from facility 704. Providing heat to waste mass 706 once again during stage t3 may reduce the rate at which heat generation and gas production levels are decreasing, thereby prolonging the optimal productive stage of the landfill prior to reaching stage t4. When the landfill eventually approaches the stable levels of stage t4, system 700 can provide a constant source of heat to facility 704 from waste mass 706. Depending on seasonal climate fluctuations, this heated fluid can proceed through integrated surface piping 702 towards heat exchanger 703 to be used for heating or cooling of facility 704. The production of a constant source of heat creates a renewable energy source similar to a conventional ground heat source pump.

Although the previous embodiments are based on the waste mass 706 having decomposition stages as shown in FIG. 8, the system would be applicable in other types of waste landfills. In addition to municipal solid waste landfills, elevated temperatures also have been observed in other types of landfills. For example, in a case study, Klein et al. (2001) reported that temperatures up to 87° C. were observed at a municipal solid waste incineration bottom ash landfill. These elevated temperatures were due to exothermic reactions occurring in the waste mass with the highest temperatures occurring in the central zones of the waste mass. Additional information can be found in Klein, R., et al., for "Temperature development in a modern municipal solid waste incineration (MSWI) bottom ash landfill with regard to sustainable waste management" (Klein, R., Baumann, T., Kahapka, E., Niessner, R., *Journal of Hazardous Materials*, B83, p. 265-80 (2001)), which is hereby incorporated by reference in its entirety. Although these various waste types may not display similar biochemical reactions as shown in FIG. 8, system 700 may still be used to exchange heat and control temperature within these various waste types.

In addition to the preceding benefits, managing the temperature of waste mass 706 can directly influence the geomechanical behavior of the waste mass. The engineering properties of soils vary as a function of temperature. For example, see Mitchell, J. K. & Soga, K., *Fundamentals of Soil Behavior*, John Wiley & Sons, Inc. Hoboken, N.J. (3rd ed. 2005), which is hereby incorporated by reference in its entirety. The particulate structure of geomaterials is affected by changes in temperature due to particle contact characteristics. Stiffness and strength of particle contacts have been described using the rate process theory, and temperature-dependent prediction models using this theory have been developed to predict soil settlement. Fox, P. J., "An Analysis of One-Dimensional Creep of Peat," Ph.D. Thesis, University of Wisconsin, Department of Civil and Environmental Engineering, Madison Wis. (1992), which is hereby incorporated by reference in its entirety. Fluids within geomaterials—typically water—are also affected by changes in temperature. Viscosity of fluids change with temperature and excess pore water pressures are developed due to differential thermal expansion of liquid and solid phases of the composite materials. Campanella, R. G. & Mitchell, J. K., "Influence of Temperature Variations on Soil Behavior," *Journal of Soil Mechanics and Foundation Engineering*, ASCE, Vol. 94, SM3, p. 709-734 (1968), which is hereby incorporated by reference in its entirety. Analogies between engineering behavior of wastes (i.e., shear strength, compressibility, and hydraulic conductivity) and soils have been commonly reported. Therefore, similar dependence of temperature on waste properties is expected as temperature-dependent tests on the engineering properties of wastes have been reported in, for example, Lamothe, D. & Edgers, L., "The Effects of Environmental Parameters on the Laboratory Compression of Refuse," *Proceedings of the 17th International Madison Waste Conference*, University of Wisconsin, Madison, Wis., p. 592-604 (1994), which is hereby incorporated by reference in its entirety. Accordingly, similar to the heat generating properties discussed above, manipulation of the thermal energy of waste mass 706 can also regulate the engineering behavior of the waste mass.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for municipal solid waste landfills; however, the invention can be used for an ash landfill, chemical or industrial waste landfill, mining wastes, or any organic degradation system. Additionally and obviously, features may be added or subtracted as desired. Accordingly, the invention is not to be restricted except in light of the attached claims and their equivalents.

What is claimed is:

1. A temperature control and heat exchange system comprising:
    a closed-loop fluid circulation pipe;
    at least one heat transfer well providing a thermal encasement for the closed-loop fluid circulation pipe, the heat transfer well filled at intervals with a highly conductive granular backfill and a highly insulative backfill;
    wherein the at least one heat transfer well is installed in a waste mass;
    a heat exchanger having an inlet and outlet for a first circulation fluid and an inlet and outlet for a second circulation fluid;
    a circulation pump operatively coupled to the closed-loop circulation pipe to provide fluid flow for the first circulation fluid;
    wherein the heat exchanger is fluidly coupled to the closed-loop fluid circulation pipe at the inlet and outlet for the first circulation fluid such that the first circulation fluid, when circulated through the closed-loop fluid circulation pipe via the circulation pump into the at least one heat transfer well distributed in the waste mass, transfers thermal energy between the waste mass and the second circulation fluid through the heat exchanger, and
    wherein the highly conductive granular backfill and highly insulative backfill are removable, shiftable and replacable.

2. The temperature control and heat exchange system of claim 1, further comprising:
    a microprocessor computer coupled to both the heat exchanger and the circulation pump, wherein the microprocessor computer is operable to control, via control signals, fluid flow of the first circulation fluid using the circulation pump and thermal energy transfer of the first circulation fluid using the heat exchanger.

3. The temperature control and heat exchange system of claim 2, further comprising:
    a network of sensors integrated into the closed-loop fluid circulation pipe and the waste mass and electronically coupled to the computer providing control signals to the computer, wherein the network of sensors is operable to detect at least one of temperature, position, time, and flow-rate.

4. The temperature control and heat exchange system of claim 1, wherein the at least one heat transfer well encasing the closed-loop fluid circulation pipe is installed in the waste mass in one or more of: vertically, horizontally, declining or inclining orientations.

5. The temperature control and heat exchange system of claim 1, further comprising:
    a thermostat-controlled trace heater operable to prevent freezing of the first circulation fluid.

6. The temperature control and heat exchange system of claim 1, wherein the heat exchanger is a plate and frame heat exchanger.

7. The temperature control and heat exchange system of claim 1, wherein the highly conductive granular backfill is dense gravel, soil, or industrial byproduct.

8. The temperature control and heat exchange system of claim 1, wherein the closed-loop fluid circulation pipe is plastic, metal, or composite material.

9. The temperature control and heat exchange system of claim 1, wherein the first circulation fluid is water, propylene glycol, or a water-glycol mixture.

10. The temperature control and heat exchange system of claim 1, wherein the at least one heat transfer well is covered by an insulating seal at a ground surface.

11. A process of controlling the temperature in a waste mass when the waste mass has at least a first, second, third, and fourth life cycle stage of biochemical processes using a heat exchanger, comprising:

using the heat exchanger which is fluidly coupled with a first circulation fluid and a second circulation fluid to transfer a first level of thermal energy from the second circulation fluid to the first circulation fluid during the first life cycle stage of biochemical processes of the waste mass, using the heat exchanger to transfer a second level of thermal energy from the first circulation fluid to the second circulation fluid during the second life cycle stage of biochemical processes of the waste mass, using the heat exchanger to transfer a third level of thermal energy from the second circulation fluid to the first circulation fluid during the third life cycle stage of biochemical processes of the waste mass, and using the heat exchanger to transfer a fourth level of thermal energy from the first circulation fluid to the second circulation fluid during the fourth life cycle stage of biochemical processes of the waste mass, where the first circulation fluid circulates in a closed-loop fluid circulation pipe due to operation of a circulation pump coupled to the closed-loop circulation pipe and the closed-loop circulation pipe is encased in at least one heat transfer well which is filled at intervals with a highly conductive granular backfill and a highly insulative backfill, wherein the highly conductive granular backfill and highly insulative backfill are removable, shiftable and replacable.

12. The process of controlling the temperature in a waste mass when the waste mass has at least a first, second, third, and fourth life cycle stage of biochemical processes using a heat exchanger of claim 11, wherein the transfer of the first level of thermal energy from the second circulation fluid to the first circulation fluid during the first life cycle stage of biochemical processes of the waste mass cools the waste mass.

13. The process of controlling the temperature in a waste mass when the waste mass has at least a first, second, third, and fourth life cycle stage of biochemical processes using a heat exchanger of claim 11, wherein the transfer of the first level of thermal energy from the second circulation fluid to the first circulation fluid at the first life cycle stage of biochemical processes of the waste mass heats to the waste mass.

14. A method of temperature control and heat exchange in a waste mass comprising:

routing at least one heat transfer well in the waste mass;

channeling a closed-loop fluid circulation pipe into the at least one heat transfer well such that the at least one heat transfer well provides a thermal encasement for the closed-loop fluid circulation pipe, the at least one heat transfer well filled at intervals with a highly conductive granular backfill and a highly insulative backfill that are removable, shiftable and replacable;

circulating a first circulation fluid in the closed-loop fluid circulation pipe using a circulation pump operatively coupled to the closed-loop circulation pipe; and exchanging heat between the first circulation fluid and a second circulation fluid using a heat exchanger, the heat exchanger having an inlet and outlet for the first circulation fluid and being hydraulically coupled to provide fluid circulation to the closed-loop circulation pipe at the inlet and outlet for the first circulation fluid and having an inlet and outlet for the second circulation fluid.

15. The method of temperature control and heat exchange in a waste mass of claim 14, wherein the heat exchanger and the circulation pump are coupled to a microprocessor computer operable to control, via control signals, fluid flow of the first circulation fluid using the circulation pump and thermal energy transfer of the first circulation fluid using the heat exchanger.

16. The method of temperature control and heat exchange in a waste mass of claim 14, wherein exchanging heat between the first circulation fluid and the second circulation fluid influences at least one of shear strength, compressibility, and hydraulic conductivity of the waste mass.

17. The method of temperature control and heat exchange in a waste mass of claim 14, wherein the first circulation fluid is water, propylene glycol, or a water-glycol mixture.

18. The method of temperature control and heat exchange in a waste mass of claim 14, comprising:

monitoring at least one of temperature, position, time, and flow-rate of the first circulation fluid using a network of sensors integrated into the closed-loop fluid circulation pipe and the waste mass, the network of sensors electronically coupled to the computer providing control signals to the computer.

* * * * *